United States Patent
Dowd (10) Patent No.: US 9,538,816 B2
(45) Date of Patent: Jan. 10, 2017

(54) FORMING TOUCH FASTENERS ON SUBSTRATES

(71) Applicant: Velcro BVBA, Deinze (BE)

(72) Inventor: Clinton Dowd, Goffstown, NH (US)

(73) Assignee: Velcro BVBA, Deinze (BE)

( * ) Notice: Subject to any disclaimer, the term of this patent is extended or adjusted under 35 U.S.C. 154(b) by 622 days.

(21) Appl. No.: 14/028,723

(22) Filed: Sep. 17, 2013

(65) Prior Publication Data

US 2014/0017442 A1   Jan. 16, 2014

Related U.S. Application Data

(62) Division of application No. 12/209,076, filed on Sep. 11, 2008, now Pat. No. 8,551,377.

(60) Provisional application No. 60/971,469, filed on Sep. 11, 2007.

(51) Int. Cl.
*A44B 18/00* (2006.01)
*B29C 43/22* (2006.01)
*B29C 43/46* (2006.01)
*B29L 31/00* (2006.01)

(52) U.S. Cl.
CPC ....... *A44B 18/0084* (2013.01); *A44B 18/0057* (2013.01); *A44B 18/0065* (2013.01); *B29C 43/222* (2013.01); *B29C 43/46* (2013.01); *B29C 2043/461* (2013.01); *B29L 2031/729* (2013.01); *Y10T 24/2733* (2015.01); *Y10T 24/2792* (2015.01); *Y10T 428/24017* (2015.01)

(58) Field of Classification Search
CPC ............ A44B 18/0057; A44B 18/0065; A44B 18/0084; B29C 43/222; B29C 43/46; B29C 2043/461; B29L 2031/729; Y10T 24/2733; Y10T 24/2792; Y10T 428/24017
USPC .......................................................... 428/100
See application file for complete search history.

(56) References Cited

U.S. PATENT DOCUMENTS

| | | |
|---|---|---|
| 4,794,028 A | 12/1988 | Fischer |
| 5,260,015 A | 11/1993 | Kennedy et al. |
| 5,441,687 A | 8/1995 | Murasaki et al. |
| 5,518,795 A | 5/1996 | Kennedy et al. |
| 5,669,120 A | 9/1997 | Wessels et al. |
| 5,945,193 A | 8/1999 | Pollard et al. |
| 6,489,003 B1 | 12/2002 | Levitt et al. |
| 6,692,674 B1 | 2/2004 | Kurtz et al. |
| 7,037,457 B2 | 5/2006 | Seidel et al. |
| 7,048,818 B2 | 5/2006 | Krantz et al. |
| 7,244,382 B2 | 7/2007 | Tachauer et al. |
| 2005/0280175 A1 | 12/2005 | Tachauer et al. |
| 2008/0193709 A1* | 8/2008 | Han ........................ B29C 70/10 428/100 |

* cited by examiner

*Primary Examiner* — Maria Veronica Ewald
*Assistant Examiner* — Brian Handville
(74) *Attorney, Agent, or Firm* — Fish & Richardson P.C.

(57) ABSTRACT

A touch fastener strip includes a sheet-form material substrate having a front face, an array of fastener elements integrally molded with a resin base layer on the front face of the substrate and an array of discrete regions of resin (e.g., gripping elements) integrally molded with a resin base layer through apertures in the sheet-form material on the back face of the substrate. The array of fastener elements forms a discrete band of fastener elements extending longitudinally along the front face of the fastener strip, and the array of gripping elements forms a discrete band of gripping elements extending longitudinally along the back face of the fastener strip.

19 Claims, 6 Drawing Sheets

FORMING TOUCH FASTENERS ON SUBSTRATES

CROSS-REFERENCE TO RELATED APPLICATIONS

This is a divisional of U.S. Ser. No. 12/209,076, filed on Sep. 11, 2008, entitled Forming Touch Fasteners on Substrates. This application claims the benefit of U.S. Provisional Application No. 60/971,469 filed on Sep. 11, 2007. The disclosures of these prior applications are hereby incorporated by reference in their entireties and are therefore considered part of the disclosure of this application.

TECHNICAL FIELD

This invention relates generally to forming touch fasteners on substrates and methods and apparatus for their manufacture.

BACKGROUND

Early touch fastener systems featured two mating tapes, each being knit or woven. One tape would include loops of filament woven into a base, and the other would include filaments woven to form loops and then cut to form hooks.

More recently, continuous molding of fastener elements extending from a common sheet-form resin base has resulted in less expensive and thinner hook fastener tapes. Significant improvements in this area include the development of continuous fastener tape molding using fixed mold cavities (see Fischer, U.S. Pat. No. 4,794,028). Further improvements have reduced the size of the fastener elements moldable by such techniques, to heights of 0.015 inch or less, which provide a very smooth touch when arranged in dense arrays.

As molded fastener tape has been improved to be more flexible and less expensive, it has found application in disposable garments, such as diapers. In typical diaper applications, a fastening tab is formed with a continuous strip of fastener tape, which includes lanes of hooks, laminated to the tab substrate.

SUMMARY

The invention enables, in several of its aspects, a touch fastener product having a band of hooks extending from a front face of a sheet-form material substrate and a band of grip dots extending from a back face of a common sheet-form material substrate. Among other applications, this product can be included on disposable garments to function as a closure tab.

According to one aspect of the invention, a touch fastener strip includes a sheet-form material substrate having a front face, an array of fastener elements integrally molded with a resin base layer on the front face of the substrate and an array of gripping elements integrally molded with a resin base layer through apertures in the sheet-form material on the back face of the substrate. The array of fastener elements forms a discrete band of fastener elements extending longitudinally along the length of the front face of the fastener strip, and the array of gripping elements forms a discrete band of gripping elements extending longitudinally along length of the back face of the fastener strip.

In some cases, the fastener strip is constructed where the fastening elements are not directly opposite the gripping elements.

According to a second aspect of the invention, a method of fabricating a touch fastener product is provided. The method includes steps of feeding flowable resin and sheet-form material into a nip between two rotating rolls including a mold roll defining an array of cavities extending inward from a peripheral roll surface, and forming a base layer of resin laminated to the sheet-form material under pressure in the nip while molding an array of discrete projections of the resin in the cavities, such that the projections and the base layer form a seamless mass of the resin, and forming engageable heads of the resin on the projections, thereby forming an array of fastener elements extending from the base layer, and forming an array of discrete regions of the resin on a side of sheet-form material opposite the projections, each discrete region comprising exposed resin surrounded by exposed sheet-form material, the discrete regions formed of resin pressed through apertures defined in the sheet-form material by pressure in the nip, and cooling the resin to solidify the projections, and releasing the cooled resin from the mold roll.

In some methods, the engageable heads of the fastener elements are formed while molding the discrete projection of the fastener elements. In some cases, the fastener elements are J-hook shaped.

In some methods, the engageable heads and the discrete projection of the fastener elements are not molded and formed, respectively, simultaneously. In some cases, the fastener elements are mushroom-shaped.

In some methods, the resin forming the discrete region flows through apertures defined by severed edges of the sheet-form material.

In some methods, prior to feeding the sheet-form material into the nip, the method includes cutting apertures into the sheet form material. In some cases, the apertures are cut so as to form an evenly spaced array of apertures.

In some methods, at least some of the discrete projections are directly opposite respective discrete regions.

In some methods, the discrete projections and the discrete regions are separated by a lane of resin-free sheet-form material.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
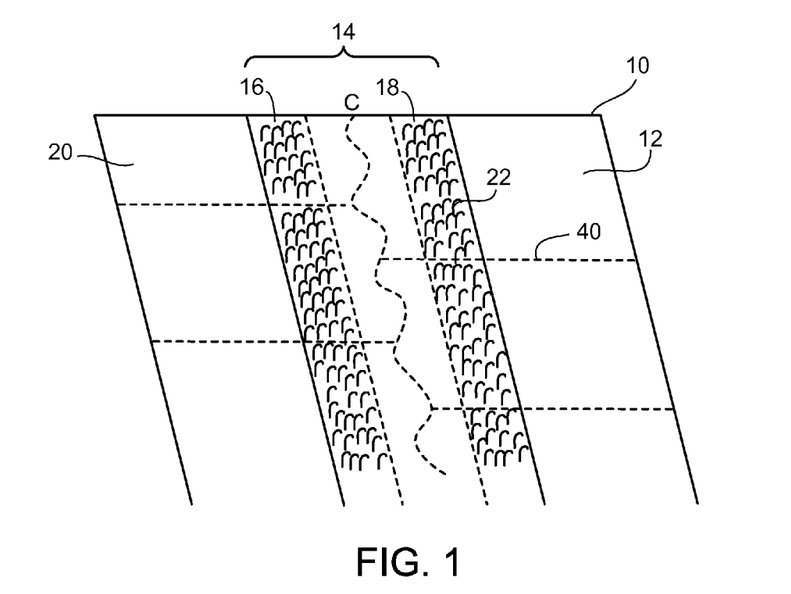
FIG. 1 is a perspective view of the front face of a touch fastener product.
Figure 1A:
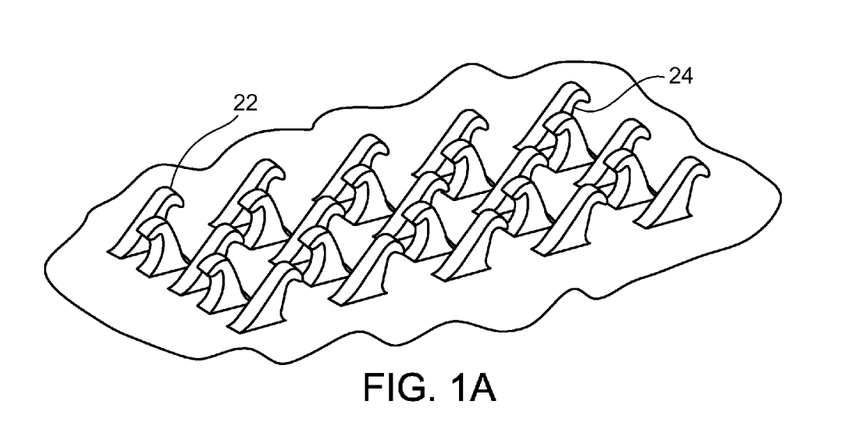
FIG. 1A is an enlarged perspective view of a portion of an array of hook-shaped fastener elements.

Referring to FIG. 1, a lengthwise-continuous touch fastener strip 10, such as for disposable garments, includes a thin, sheet-form material substrate 12 with a lengthwise-continuous stripe of a resin base layer 14 and parallel bands 16 and 18 of fastener elements attached to the stripe 14 on its front face 20. Bands 16 and 18 are equally spaced from the center "C" of the fastener strip and base layer 14 extends continuously from the outer edge of band 16 to the outer edge of band 18 in this example. The fastener elements 22 of bands 16 and 18 are integrally molded with base layer 14 and extend from front face 18. FIG. 1A illustrates the fastener elements 22 in this example, which are in the form of J-hooks 24 that extend, in rows, along the length of the closure strip. Some of the J-hooks 24 face in opposite directions along the strip. Other fastener element shapes may also be employed (not illustrated), including those that are in the form of mushroom-shaped projections. A suitable fastener element shape is the CFM29 hook shape (of about 0.015 inch in height), available in various products sold by Velcro USA in Manchester, N.H.

Figure 2:
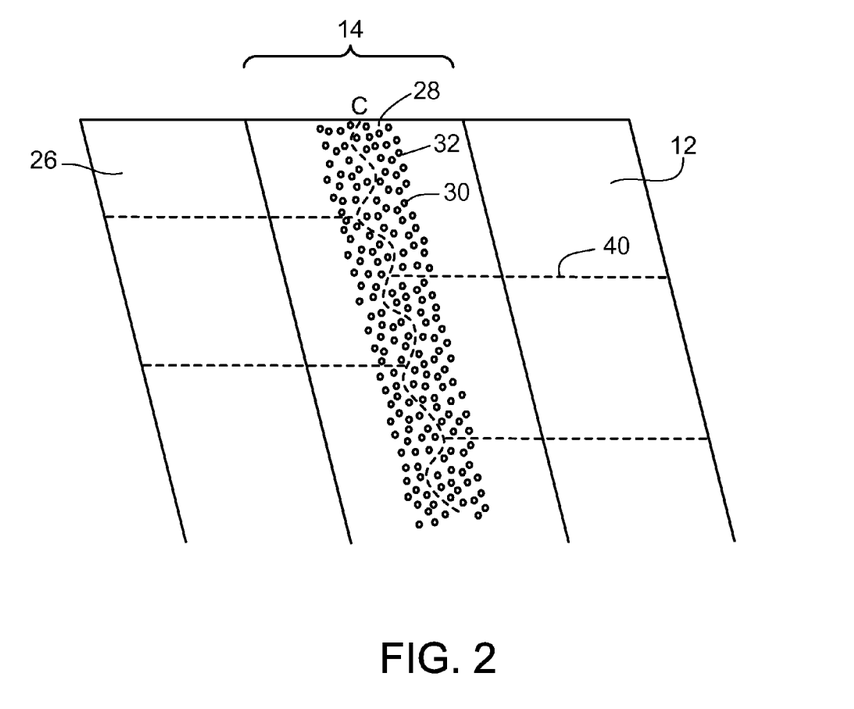
FIG. 2 is a perspective view of the back face of a touch fastener product in the form of a disposable garment tab.

Referring to FIG. 2, the back face 26 of a lengthwise-continuous touch fastener strip 10 has lengthwise-continuous, band 28 of gripping elements 32. Band 28 is centered along the center "C" of the fastener strip and extends from the inner edge of band 16 to the inner edge of band 18. The gripping elements 32 of band 28 are integrally molded with base layer 14 through apertures 30 in material substrate 12 and extend from back face 26. In this embodiment, these gripping elements are in the form of half spheres that extend, in rows, along the length of the closure strip. Other gripping element shapes may also be employed, including those that are flush with the surface of the sheet-form material substrate 12. In one suitable arrangement, the gripping elements 32 are circular dots of resin, each having a diameter of between about 1.5 to 2.5 millimeters, and spaced evenly in an array with a dot center-to-center distance of between about 6 and 12 millimeters.

The dotted lines in FIGS. 1 and 2 illustrate a cutting pattern for separating strip 10 into individual fastening tabs. The cutting pattern includes transverse cuts that intersect a longitudinal serpentine cut extending along the center "C" of the strip. The cuts are arranged such that each separated fastening tab includes a region of fastening elements on one side, near one end of the tab, and a region of gripping elements on an opposite side of the tab.

Figure 3:
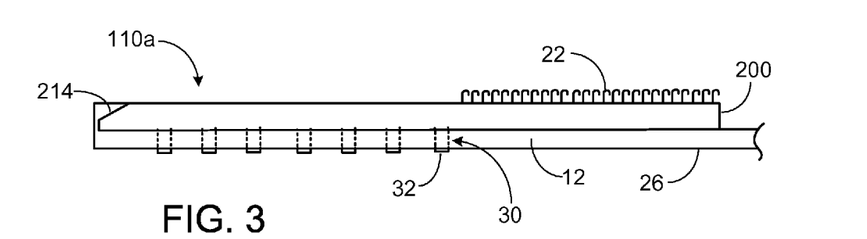
FIGS. 3-5 are cross-sectional views and illustrate examples of a touch fastener product in the form of a disposable garment tab.
Figure 4:
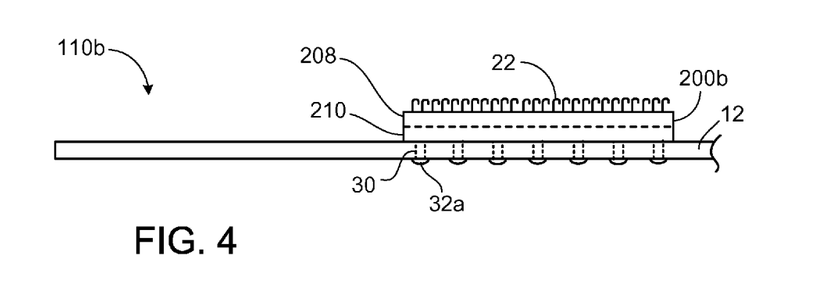
Figure 5:
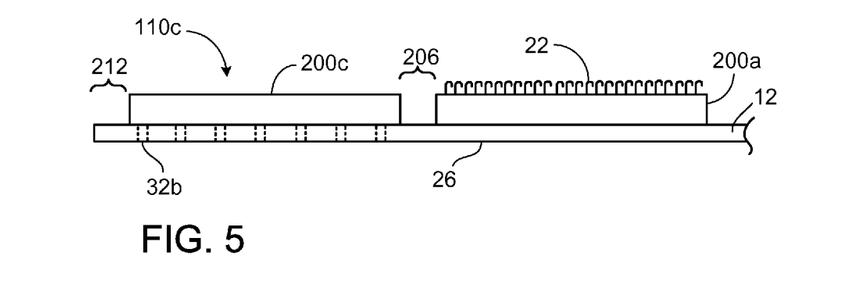

FIGS. 3 through 5 are transverse cross-sections of examples of fastening tabs separated from suitable configured fastener strips. In FIG 3, fastener tab 110a has a single stripe of resin base layer 200, from which both the fastener elements 22 and gripping elements 32 extend to form a single, seamless, contiguous mass of a single resin or blend of resin. The left end of base layer 200 in this example is severed and coincides with the severed end of the underlying substrate 26. The fastener elements 22, as shown, are not directly opposite the gripping elements 32. Tab 110a is formed by cutting the fastener strip of FIGS. 1 and 2 along the illustrated cut lines. In FIG. 4, fastener tab 110b has a single, longitudinally continuous base 200b formed as a co-extrusion or lamination of two layers of resin: an upper resin layer 208 of a resin or resin blend common with the fastener elements, and a lower resin layer 210 of a resin or resin blend common with gripping elements 32a. In this manner, the fastener elements 22 may be provided directly opposite the gripping elements 32a, while the resin of the two base layers can be selected for optimum performance of its integral features. In other words, the resin of layer 208 may be selected for optimum fastener element performance, while the resin of layer 210 may be selected for optimum formation and function of gripping elements 32. FIG. 4 also shows that gripping elements 32a may be configured to extend laterally beyond their associated substrate apertures 30, with 'rivet-shaped' heads. In FIG. 5, example 10c of fastener product 10 has two stripes of base layer 200c and 200a, respectively. One stripe of base layer 200a carries fastener elements 22. At the opposite surface of a separate base layer 200c are gripping elements 32b in the form of exposed, spaced apart resin surfaces coplanar with the surrounding substrate surface 26. A lane 206 of resin-free substrate material 12 separates the two stripes of base layer 200 and 200a, which may be optimally formed of different resins selected for fastening and gripping, respectively. Another resin-free lane 212 of substrate 12 at the distal end of tab 110c is formed by cutting the substrate between spaced-apart longitudinal bands of gripping element resin in the fastener strip as initially formed. In the examples of FIGS. 3 and 5, the upper, exposed surface of the base resin layer opposite the gripping elements forms an opposing grip surface, and may be molded or otherwise formed to have a suitable grip texture. In each of these examples, the base layers may be longitudinally continuous along the sheet, or may comprise longitudinally spaced-apart sections or islands of base material surrounded by exposed material 12, to provide more touch-friendly severed tab edges. Additionally dashed line 214 of FIG. 3 illustrates that the thickness of base layer 200 may be molded to taper to a very narrow edge where severed, to help avoid a rough distal tab end. Such tapering may be accomplished during molding by a suitably configured splitting feature, such as a V-shaped circumferential protrusion, extending from the mold roll of FIG. 6 and arranged to follow the center cut line of the fastener strip.

Figure 6:
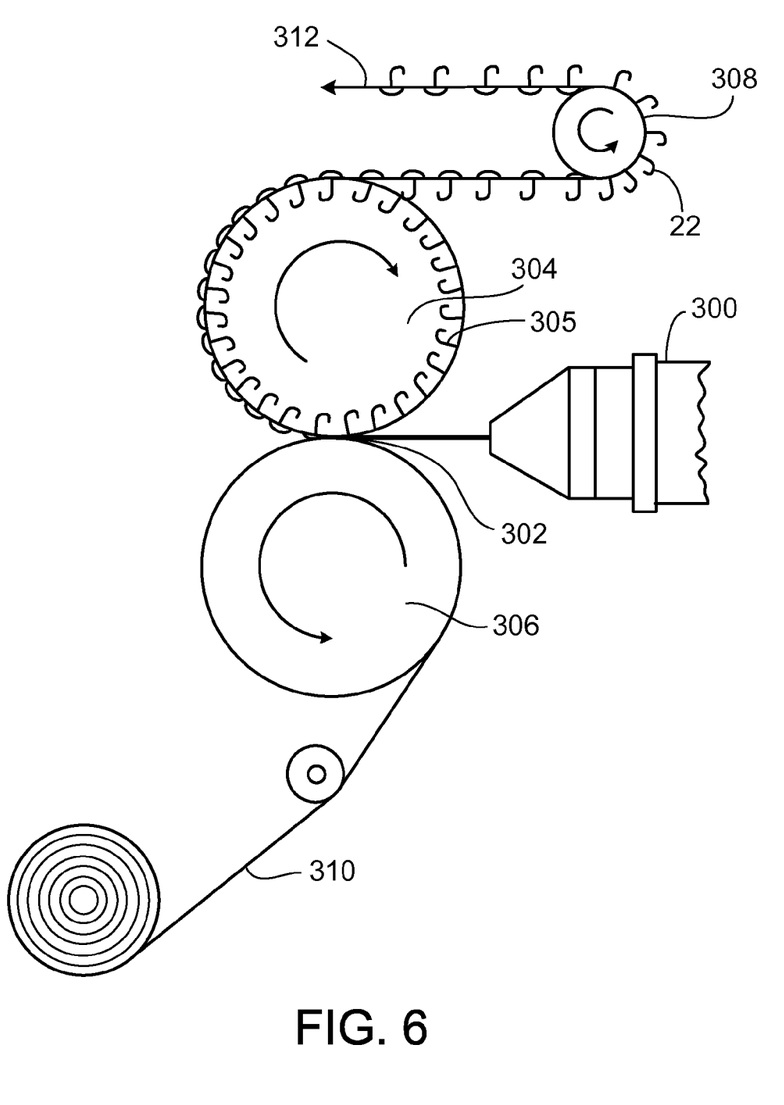
FIG. 6 illustrates a first method and apparatus for forming touch fastener products.

FIG. 6 illustrates one method and apparatus for producing the above-described fastener strips. The method builds upon the continuous extrusion/roll-forming method for molding fastener elements on an integral, sheet-form base described by Fischer in U.S. Pat. No. 4,794,028, and the nip lamination process described by Kennedy, et al. in U.S. Pat. No. 5,260,015, the details of both of which are incorporated herein by reference. The relative position and size of the rolls and other components is not to scale. An extrusion head 300 supplies a continuous sheet of molten resin to a nip 302 between a rotating mold roll 304 and a counter-rotating pressure roll 306. Mold roll 304 contains an array of miniature, fastener element-shaped mold cavities 305 extending inward from its periphery for molding the fastener elements. Pressure in nip 302 forces resin into the fastener element cavities and forms the substrate. Along with the molten resin, a continuous sheet-form material 310 is fed into nip 302, where it is partially impregnated by resin and becomes permanently bonded to the resin base layer. As supplied to the nip, substrate material 310 is pre-perforated, such that the substrate defines an array of discrete apertures where the gripping elements are to be formed. Pressure in nip 302 forces resin through the apertures in the sheet-form material and forms the gripping elements. The formed product is cooled on the mold roll until the solidified fastener elements (e.g., hooks) are stripped from their fixed cavities by a stripper roll 308. Thus, the completed fastener product 312, which is stripped from the mold roll, includes both fastener elements and gripping elements on the sheet-form material. To form the various tab and strip configurations disclosed herein, the resin may enter the nip in parallel, spaced apart bands or islands, as disclosed in Krantz et al, U.S. Pat. No. 7,048,818, also incorporated herein by reference.

Figures 7, 7A:
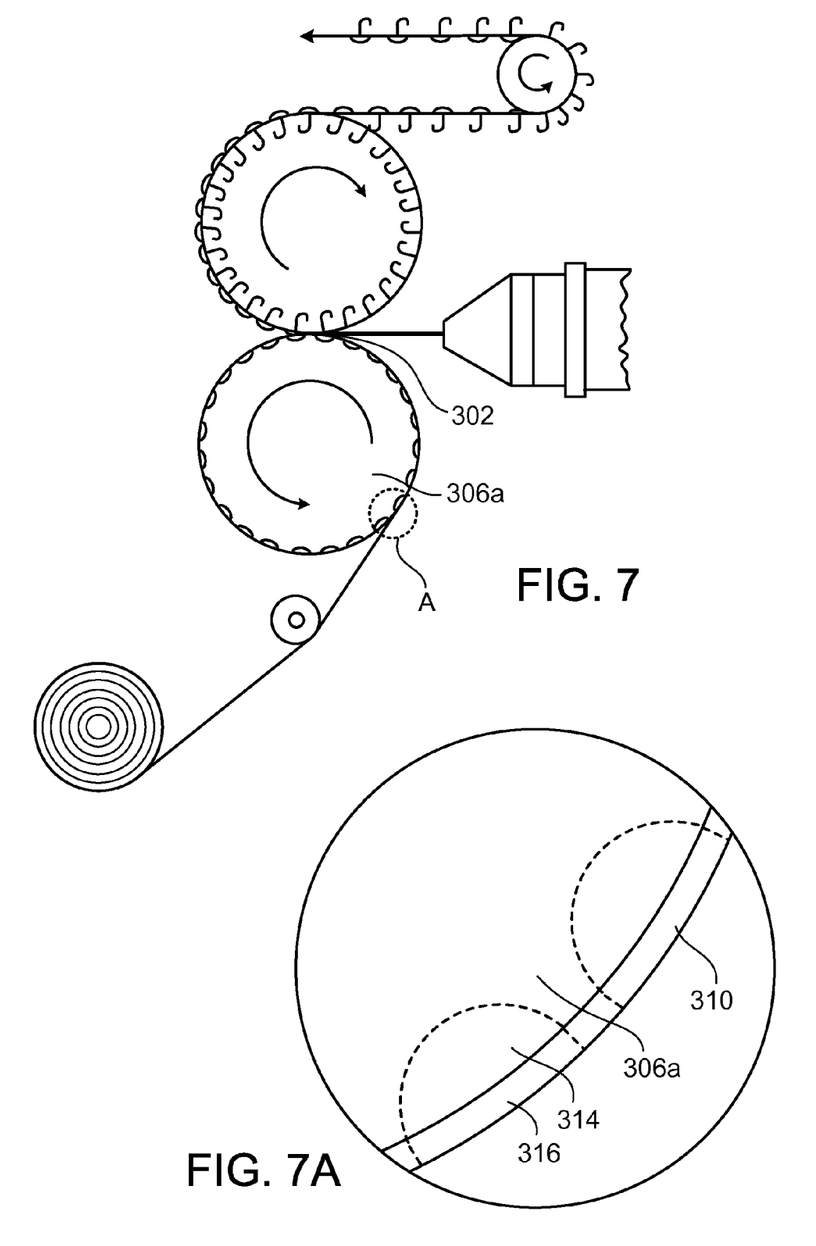
FIG. 7 illustrates a second method and apparatus for forming touch fastener products.
FIG 7a illustrates an expanded view of a selected portion of FIG 7.

FIG. 7 illustrates a variation of the above-described method. In this case, rather than forming gripping elements flush with the surface of the sheet-form material with a pressure roll that has a smooth surface, a pressure roll 306a containing an array of miniature, gripping element-shaped mold cavities extending inward from its periphery is used to form half-spherical gripping elements protruding from the surface of the sheet form material. In FIG. 7A, sheet-form material 310 is lined up with pressure roll 306a, such that the apertures 314 in the sheet-form material line up with gripping-element shaped cavities 316 as to allow resin to fill the gripping-element shaped cavities. Referring back to FIG. 7, pressure in nip 302 simultaneously forces resin into the fastener element cavities and forms the substrate on one side of the sheet-form material and through apertures in the sheet-form material into the gripping-element cavities on the opposite side of the sheet-form material.

Figure 8:
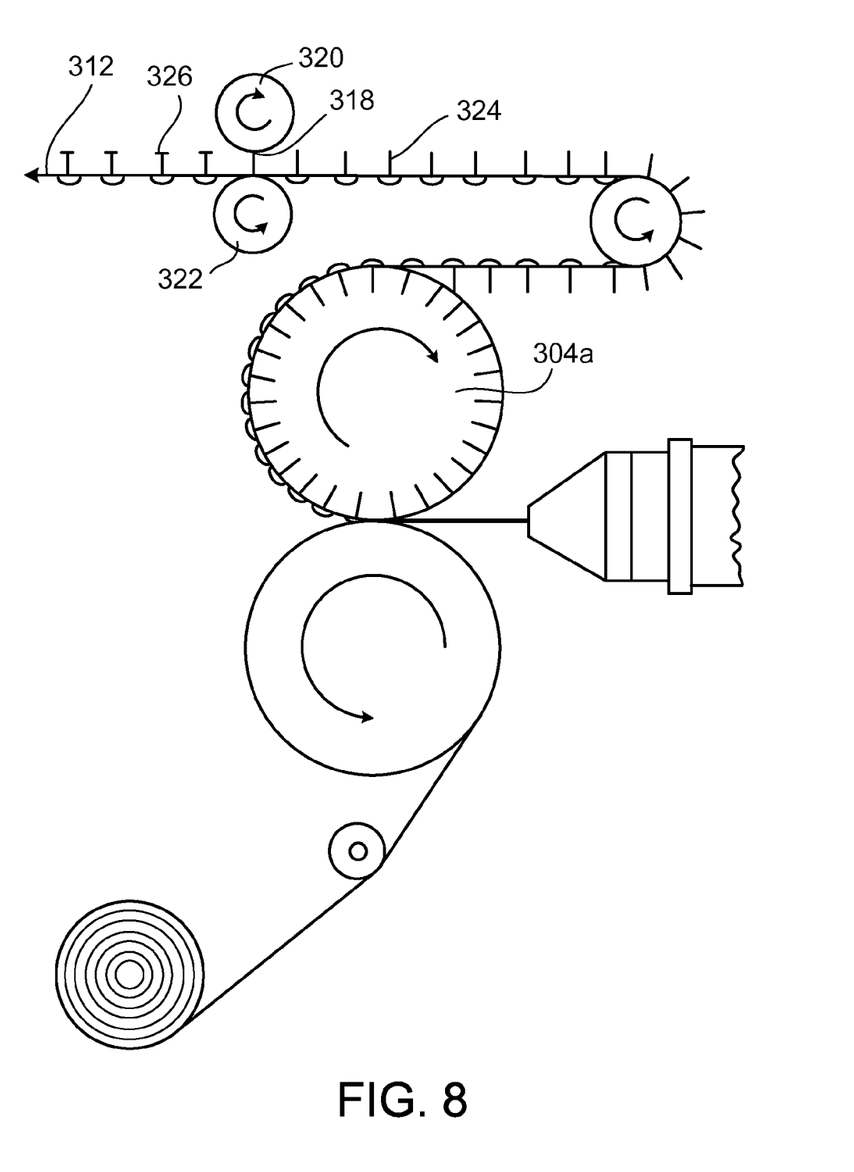
FIG. 8 illustrates a third method and apparatus for forming touch fastener products.

FIG. 8 illustrates another variation of the above-described method. For instance, rather than form hook-shaped fastener elements where discrete projections are formed while molding engageable heads, mushroom-shaped fastener elements are formed where discrete projections and engageable heads are not simultaneously formed and molded, respectively. In this case, the mold roll 304a contains an array of miniature, stem-shaped mold cavities extending inward from its periphery for molding the fastener elements. After the solidified upstanding stem elements are stripped from their fixed cavities, the product is fed into a second nip 318 between a heated rotating roll 320 and a second counter-rotating pressure roll 322. Heat from rotating roll 320 permanently deforms stems 324 to form overhanging heads 326. The fastener elements on the completed fastener product 312 are now suitable for releasable fastening.

The gripping elements may be formed of a relatively low durometer resin suitable for gripping, such as SANOPRENE rubber, thermoplastic elastomer (TPE) or the like. Preferably the gripping element material has a hardness of around 40-50 Shore A. Preferably, the gripping elements are exposed on the non-fastening side of the fastener strip as spaced-apart features each surrounded by exposed substrate. The gripping elements may be arranged in any suitable pattern, and can even form graphics, text or logos. The gripping elements may be formed of a resin of a different color than the substrate, such that the gripping elements provide a visual indication of a gripping zone.

The fastener elements may be formed from a resin with properties suitable for repeatedly bearing required fastening loads without undue distension or premature loop release. Polypropylene has been found to be a suitable resin, and may have a hardness significantly greater, as molded, than the gripping element material. The substrate material may be a preformed non-woven or knit, for example, such as Loop 3905 available from Velcro USA.

While a number of examples have been described for illustration purposes, the foregoing description is not intended to limit the scope of the invention, which is defined by the scope of the appended claims. There are and will be other examples and modifications within the scope of the following claims.

What is claimed is:

1. A touch fastener product comprising:
a flexible, sheet-form substrate;
a base layer of resin laminated to a first side of the substrate;
a multiplicity of fastener elements extending from the base layer, each fastener element comprising a discrete projection with an engageable head, the fastener elements and base layer together forming a seamless resin mass; and
a multiplicity of discrete regions of exposed resin each surrounded by an exposed surface of the sheet-form substrate on a second side of the substrate opposite the projections, the multiplicity of discrete regions extending from a single continuous layer of resin laminated to the first side of the substrate.

2. The touch fastener product of claim 1 wherein the discrete regions of resin are of the same seamless resin mass as the fastener elements and base layer.

3. The touch fastener product of claim 1 wherein the layer of resin from which the discrete regions extend is of a lower durometer than the base layer of resin from which the fastener elements extend.

4. The touch fastener product of claim 1 wherein the discrete regions each comprises a resin feature extending out of the substrate.

5. The touch fastener product of claim 1, wherein the substrate comprises a fabric.

6. The touch fastener product of claim 1, wherein the sheet-form substrate is a non-woven or knit fabric.

7. The touch fastener product of claim 1, wherein the exposed surface of the sheet-form substrate on the second side of the substrate is a fabric surface.

8. The touch fastener product of claim 1, wherein the multiplicity of discrete regions is spaced from the longitudinal edges of the sheet-form substrate on the second side of the substrate.

9. The touch fastener product of claim 1, wherein the base layer from which the projections extend, and the resin layer from which the discrete regions extend, are separated by an exposed region of the first side of the substrate.

10. The touch fastener product of claim 1, wherein the resin of the discrete regions of exposed resin is of a lower durometer than the seamless resin mass.

11. The touch fastener product of claim 1, wherein the base layer is in the form of a longitudinal band adjacent an exposed region of the first side of the substrate.

12. The touch fastener product of claim 1, wherein the base layer comprises multiple bands of resin spaced apart on the substrate.

13. A garment tab comprising:
a flexible tab substrate having at least partially exposed opposite side surfaces;
a base layer of resin covering a portion of a first side of the tab substrate and carrying a multiplicity of touch fastener elements extending from the base layer, each touch fastener element comprising a discrete projection with an engageable head, the fastener elements and base layer together forming a seamless resin mass; and
resin gripping elements disposed on a second side of the tab substrate, each resin gripping element surrounded by exposed substrate and comprising resin contiguous with a single continuous layer of resin disposed on the first side of the tab substrate and connecting multiple gripping elements.

14. The garment tab of claim 13, wherein the resin gripping elements are arranged in an array adjacent a distal, graspable end of the garment tab.

15. The garment tab of claim 13, wherein the tab substrate comprises a fabric.

16. The garment tab of claim 13, wherein the tab substrate is a non-woven or knit fabric.

17. The garment tab of claim 13, wherein the base layer carrying the touch fastener elements, and the resin contiguous with resin of the resin gripping elements, are separated by an exposed region of the first side of the tab substrate.

18. The garment tab of claim 13, wherein the resin gripping elements are of a lower durometer than the base layer.

19. The garment tab of claim 13, wherein the resin gripping elements comprise bumps of resin projecting from the tab substrate.

* * * * *